(12) United States Patent
Huo

(10) Patent No.: US 12,469,899 B2
(45) Date of Patent: Nov. 11, 2025

(54) BATTERY MODULE AND ENERGY STORAGE DEVICE

(71) Applicant: Hithium Tech HK Limited, Hong Kong (CN)

(72) Inventor: Qiqi Huo, Fujian (CN)

(73) Assignee: Hithium Tech HK Limited, Hong Kong (CN)

( * ) Notice: Subject to any disclaimer, the term of this patent is extended or adjusted under 35 U.S.C. 154(b) by 517 days.

(21) Appl. No.: 17/973,467

(22) Filed: Oct. 25, 2022

(65) Prior Publication Data

US 2023/0216104 A1 Jul. 6, 2023

(30) Foreign Application Priority Data

Jan. 6, 2022 (CN) .......................... 202220025702.5

(51) Int. Cl.
*H01M 10/6555* (2014.01)
*H01M 10/613* (2014.01)
*H01M 10/6551* (2014.01)
*H01M 10/6556* (2014.01)
*H01M 50/213* (2021.01)

(52) U.S. Cl.
CPC ..... *H01M 10/6555* (2015.04); *H01M 10/613* (2015.04); *H01M 10/6551* (2015.04); *H01M 10/6556* (2015.04); *H01M 50/213* (2021.01)

(58) Field of Classification Search
None
See application file for complete search history.

(56) References Cited

U.S. PATENT DOCUMENTS

| | | | |
|---|---|---|---|
| 2004/0194931 A1* | 10/2004 | Kato | F28F 9/18 165/133 |
| 2014/0318749 A1* | 10/2014 | Katoh | F28D 1/05391 165/151 |
| 2021/0320343 A1* | 10/2021 | Flannery | H01M 10/6568 |
| 2022/0302522 A1* | 9/2022 | Lee | B60L 58/26 |
| 2023/0168000 A1* | 6/2023 | Wang | F24F 11/89 |
| 2023/0216103 A1* | 7/2023 | Huo | H01M 10/6554 429/120 |
| 2023/0261299 A1* | 8/2023 | Wang | H01M 50/207 429/120 |
| 2023/0335820 A1* | 10/2023 | Zhou | H01M 10/6555 |
| 2023/0361406 A1* | 11/2023 | Liu | H01M 10/647 |
| 2024/0106029 A1* | 3/2024 | Flannery | H01M 50/213 |
| 2024/0142183 A1* | 5/2024 | Altman | F28D 1/05375 |
| 2024/0175642 A1* | 5/2024 | Boyd | F28F 1/08 |
| 2024/0255231 A1* | 8/2024 | Park | F28F 19/004 |
| 2024/0347810 A1* | 10/2024 | Oh | H01M 10/617 |

(Continued)

*Primary Examiner* — Kevin M Bernatz

(57) ABSTRACT

Provided are a battery module and an energy storage device. The battery module includes cylindrical cells arranged in at least two rows and a liquid-cooled assembly including at least one liquid-cooled unit each including a liquid-cooled tube and a cooling fin; the liquid-cooled tube includes a first tube arranged at an upper end of the cooling fin, a second tube, and a third tube arranged at a lower end of the cooling fin; the second tube connects one end of the first tube with one end of the third tube; the cooling fin is arranged between two adjacent rows and is connected to circumferential side surfaces of cells in the two adjacent rows; the first tube and the third tube each have an opening defined in another end thereof facing away from the second tube.

12 Claims, 5 Drawing Sheets

(56) References Cited

U.S. PATENT DOCUMENTS

| | | | |
|---|---|---|---|
| 2024/0405308 A1* | 12/2024 | Momma | H01M 10/6571 |
| 2025/0096407 A1* | 3/2025 | Lee | H01M 50/249 |
| 2025/0132411 A1* | 4/2025 | Schröter | H01M 10/6557 |

* cited by examiner

BATTERY MODULE AND ENERGY STORAGE DEVICE

CROSS-REFERENCE TO RELATED APPLICATION

The present application claims priority to Chinese Patent Application No. 202220025702.5, filed on Jan. 6, 2022, which is hereby incorporated by reference in its entirety.

TECHNICAL FIELD

The present disclosure relates to the field of energy storage technology, and in particularly, to a battery module and an energy storage device.

BACKGROUND

At present, a battery module includes a plurality of cylindrical battery cells which are arranged in rows and columns. The temperature of the battery cells increases during operation, and therefore, each battery cell needs to be cooled. However, if the battery cells are not uniformly cooled, the performances of the battery cells differ greatly, and the performance consistency of the battery cells is reduced.

SUMMARY

Embodiments of the present disclosure provide a battery module and an energy storage device.

Embodiments of the present disclosure provide a battery module. The battery module includes a plurality of battery cells each in a cylindrical shape and a liquid-cooled assembly. The plurality of battery cells is arranged in at least two rows. The liquid-cooled assembly includes at least one liquid-cooling unit. Each of the at least one liquid-cooled unit includes a liquid-cooled tube and a cooling fin. The liquid-cooled tube includes a first tube arranged at an upper end of the cooling fin, a second tube, and a third tube arranged at a lower end of the cooling fin. The second tube connects one end of the first tube with one end of the third tube. The cooling fin is arranged between two adjacent rows and is connected to circumferential side surfaces of battery cells in the two adjacent rows. The first tube has a first opening defined in another end thereof facing away from the second tube, and the third tube has a second opening defined in another end thereof facing away from the second tube, the first opening and the second opening being located on a same side of the at least two rows.

According to the battery module, the liquid-cooled tube is connected to the upper end and the lower end of the cooling fin, one of the first opening and the second opening can serve as a liquid inlet, and the other one of the first opening and the second opening can serve as a liquid outlet. In the process of cooling, the temperature of the liquid inlet is the lowest, the temperature gradually increases as a liquid flows in the cooling tube, and when the liquid reaches the liquid outlet, the temperature is the highest, that is, the temperature of the first tube and the temperature of the second tube increase in opposite directions relative to each other, so that the temperature at each position of the cooling fin can be kept consistent, the temperatures of the battery cells can be kept consistent, thus, the consistency of the cooling effects of the battery cells is improved, and the performance consistency of the battery cells is improved.

In some embodiments, the cooling fin is of a wavy structure, the wavy structure has a plurality of recesses defined on two opposite surfaces thereof, and the circumferential side surfaces of the battery cells are partially accommodated in the plurality of recesses, respectively.

In some embodiments, a radian of a bottom surface of each of the plurality of recesses is substantially same as a radian of a circumferential side surface of each of the battery cells.

In some embodiments, the first tube is in a wavy shape matching a shape of the upper end of the cooling fin, and/or the third tube is in a wavy shape matching a shape of the lower end of the cooling fin.

In some embodiments, the second tube perpendicularly connects the first tube with the third tube In some embodiments, the upper end of the cooling fin is bent to define a first accommodating groove, the lower end of the cooling fin is bent to define a second accommodating groove, the first tube is accommodated in the first accommodating groove, and the third tube is accommodated in the second accommodating groove.

In some embodiments, a thermal conductive pad is arranged between the cooling fin and the circumferential side surfaces of the battery cells, and the thermal conductive pad connects the cooling fin with the battery cells.

The energy storage device provided by the embodiments of the present disclosure includes the battery module of any one of the above embodiments.

According to the energy storage device, the liquid-cooled tube is connected to the upper end and the lower end of the cooling fin, one of the first opening and the second opening can serve as the liquid inlet, and the other one of the first opening and the second opening can serve as the liquid outlet. In the process of cooling, the temperature of the liquid inlet is the lowest, the temperature gradually increases as a liquid flows in the liquid-cooled tube, and when the liquid reaches the liquid outlet, the temperature is the highest, that is, the temperature of the upper part and the temperature of the lower part of the liquid-cooled tube increase in opposite directions relative to each other, so that the temperature at each position of the cooling fin can be kept consistent, the temperatures of the battery cells can be kept consistent, thus, the consistency of the cooling effects of the battery cells is improved, and the performance consistency of the battery cells is improved.

The additional aspects and advantages of the present disclosure will be partially given in the following description, part of which will become apparent from the following description or be understood through the practice of the present disclosure.

BRIEF DESCRIPTION OF DRAWINGS

The above-mentioned and/or additional aspects and advantages of the present disclosure will become apparent and easy to understand from the following description of embodiments taken in conjunction with the accompanying drawings, in which.

DESCRIPTION OF EMBODIMENTS

Figure 1:
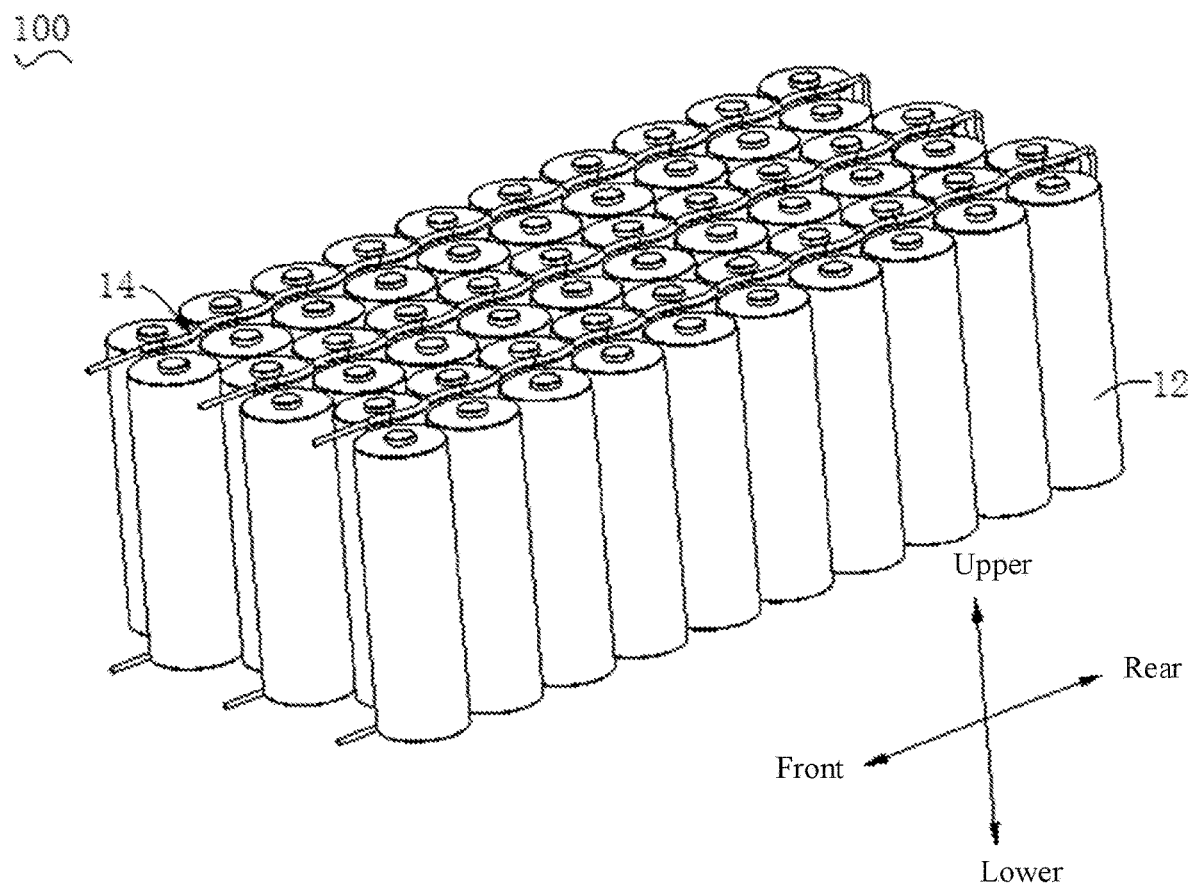
FIG. 1 is a three-dimensional schematic diagram of a battery module according to some embodiments of the present disclosure.

Embodiments of the present disclosure are described in detail below, and the examples of the embodiments are shown in the drawings, throughout which the same or similar reference numerals indicate the same or similar elements or elements having the same or similar functions. The embodiments described below with reference to the drawings are exemplary, only intended to explain the embodiments of the present disclosure but not to be construed as limiting the present disclosure.

In the embodiments of the present disclosure, the expression that a first feature is "on" or "beneath" a second feature may include that the first and second features are in direct contact, and may also include that the first and second features are not in direct contact but in contact through additional features therebetween. Moreover, the first feature being "above" the second feature may include the first feature being just above and obliquely above the second feature, or only represents that the level of the first feature is higher than the level of the second feature. The first feature being "beneath", "under", or "below" the second feature may include the first feature being just under and obliquely under the second feature, or only represents that the level of the first feature is lower than the level of the second feature.

The following disclosure provides many different embodiments or examples for implementing different structures of the present disclosure. In order to simplify the disclosure of the embodiments, the components and arrangements of specific examples are described below. Of course, they are merely examples and are not intended to limit the present disclosure. In addition, the present disclosure may repeat reference numbers and/or reference letters in various examples, which are for the purpose of simplicity and clarity, and do not indicate a relationship between various implementations and/or arrangements discussed. In addition, the present disclosure provides examples of various specific processes and materials, but a person of ordinary skill in the art will be aware of the application of other processes and/or the use of other materials.

Referring to FIG. 1 to FIG. 6, some embodiments of the present disclosure provide a battery module 100, which includes a plurality of battery cells 12 and a liquid-cooled assembly 14.

Each of the plurality of battery cells 12 is cylindrical, and the plurality of battery cells 12 is arranged in at least two rows 16. The liquid-cooled assembly 14 includes at least one liquid-cooled unit 18. Each of the at least one liquid-cooled unit 18 includes a liquid-cooled tube 20 and a cooling fin 22. The liquid-cooled tube 20 includes a first tube 24, a second tube 26, and a third tube 28. The second tube 26 connects one end of the first tube 24 with one end of the third tube 28. The first tube 24 is arranged at an upper end 30 of the cooling fin 22. The third tube 28 is arranged at a lower end 32 of the cooling fin 22. The cooling fin 22 is arranged between two adjacent rows 16 and is connected to circumferential side surfaces of battery cells 12 in the two adjacent rows. The first tube 24 has a first opening 34 defined in another end thereof facing away from the second tube 26. The third tube 28 has a second opening 36 defined in another end thereof facing away from the second tube 26. The first opening 34 and the second opening 36 are located on a same side of the at least two rows 16.

According to the battery module 100, the liquid-cooled tube 20 is connected to the upper end 30 and lower end 32 of the cooling fin 22, one of the first opening 34 and the second opening 36 can serve as a liquid inlet, and the other one of the first opening 34 and the second opening 36 can serve as a liquid outlet. In the process of cooling, the temperature of the liquid inlet is the lowest, the temperature gradually increases as a liquid flows in the liquid-cooled tube, and when the liquid reaches the liquid outlet, the temperature is the highest, that is, the temperatures of the upper part of the liquid-cooled tube 20 and the temperature of the lower part of the liquid-cooled tube 20 increase in opposite directions relative to each other. Therefore, the temperature at each position of the cooling fin 22 can be kept consistent, the temperatures of the battery cells 12 can be kept consistent, thus, the consistency of the heat dissipation effects of the battery cells 12 is improved, and the performance consistency of the battery cells is improved. In addition, the liquid-cooled assembly 14 of the embodiments of the present disclosure also has the following effects: (1) the cost is low, and the assembling process is simple; (2) the liquid-cooled assembly has a safe structure and high reliability; (3) the liquid-cooled assembly is light in weight and small in volume, and the battery energy density can be increased; and (4) the cooling assembly can be recycled.

Specifically, the battery cells 12 may be lithium battery cells 12 or other types of battery cells 12, which are not specifically limited herein. The number of the battery cells 12 may be determined according to factors such as the electricity storage demand of a single battery module 100, the electricity storage demand of an entire energy storage device, and an installation site. The external dimensions of the plurality of battery cells 12 are basically the same, and the plurality of battery cells 12 can be of the same type.

Figure 2:
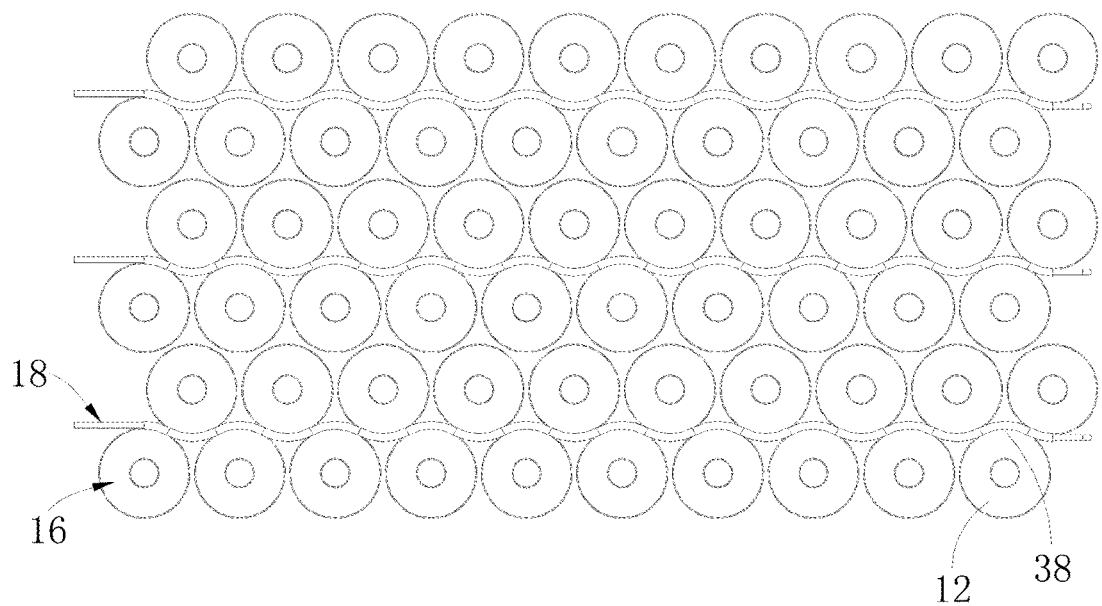
FIG. 2 is a plan schematic diagram of a battery module according to some embodiments of the present disclosure.

In the embodiment shown in FIG. 2, the plurality of battery cells 12 is arranged in six rows 16, and each of the six rows 16 includes ten battery cells 12. For two adjacent rows 16, battery cells 12 in one of the two adjacent rows 16 are staggered with battery cells in the other one of the two adjacent rows 16. The staggered arrangement can be understood as an arrangement that the battery cells 12 in one of the two adjacent rows 16 are partially located in space between two adjacent battery cells 12 in the other row 16. It should be noted that the number of the battery cells 12 and the number of the rows 16 are not specifically limited in the present disclosure.

Both the liquid-cooled tube 20 and the cooling fin 22 can be made of metals, such as copper, aluminum or other metals or alloys. In one embodiment, the liquid-cooled tube 20 is formed integrally from an aluminum material, and the cooling fin 22 is formed integrally from an aluminum material. In the embodiment shown in the figure, three liquid-cooled units 18 are included, and the three liquid-cooled units are each arranged between two adjacent rows 16.

The first tube 24, the second tube 26, and the third tube 28 are connected to form a substantially U-shaped structure, and the cooling fin 22 is located in the space defined by the U-shaped structure.

In one embodiment, the first opening 34 serves as a liquid inlet, and the second the opening 36 serves as a liquid outlet. When the liquid-cooled assembly 14 is in operation, the liquid enters from the liquid inlet, and flows through the liquid-cooled tube 20 to the liquid outlet to be discharged; and the temperature of the liquid is transferred to the cooling fin 22 through a tube wall, and the temperature of the cooling fin 22 is transferred to the battery cells 12 to achieve the purpose of cooling of the battery cells 12. In the cooling process, the temperature of the liquid inlet is the lowest, and the temperature gradually increases as a liquid flows in the tube, and when the liquid reaches the liquid outlet, the temperature is the highest. The liquid inlet and the liquid outlet are located on a same side of the rows 16, that is, the temperature of the upper part of the liquid-cooled tube 20 and the temperature of the lower part of the liquid-cooled tube 20 increase in opposite directions relative to each other, so that the temperature at each position of the cooling fin 22 can be kept consistent, the temperatures of the battery cells 12 can be kept consistent, thus, the consistency of the cooling effect of the battery cells 12 is improved, and the cycle life of the battery cells 12 is prolonged. In other embodiments, the second opening 36 is used as a liquid inlet, and the first opening 34 is used as a liquid outlet. The liquid may be water, or oil or other cooling liquid, which is not specifically limited here.

The battery module can include a support frame (not shown in the figures), which can support and fixing the battery cells and the liquid-cooled assembly. The battery module may further include a box (not shown in the figures), and components such as the support frame, the battery cells, and the liquid-cooled assembly can be placed in the box.

In some embodiments, referring to FIG. 2, the cooling fin 22 is of a wavy structure, the wavy structure has a plurality of recesses 38 defined in two opposite surfaces thereof, and circumferential side surfaces of the battery cells 12 are partially accommodated in the recesses 38, respectively. Thus, the cooling area of the cooling fin 22 can be increased, and the volume of the battery module 100 can be reduced.

Specifically, compared with a cooling fin 22 of a flat plate structure, the cooling fin 22 of the wavy structure can have an increased surface area, thus, the cooling area of the cooling fin 22 is increased, and the cooling efficiency of the battery cells 12 is improved.

Since the circumferential side surfaces of the battery cells 12 are partially accommodated in the recesses 38, respectively, the battery cells 12 can be closer to each other, and the overall volume of the battery module 100 is reduced.

In some embodiments, a radian of a bottom surface of each of the plurality of recesses 38 is substantially same as a radian of a circumferential side surface of each of the battery cells 12. Thus, the cooling fin 22 and the battery cells 12 can be better fitted, and the cooling efficiency of the battery cells 12 is improved.

Specifically, each of the battery cells 12 is a cylindrical cell 12, a circumferential side surface of each of the battery cells 12 is arc-shaped, a bottom surface of each of the recesses 38 is also arc-shaped, and moreover, the radian of the circumferential side surface of each of the battery cells 12 is substantially the same as the radian of the bottom surface of each of the recesses 38. Therefore, when the circumferential side surfaces of the battery cells are accommodated in the recesses 38, the circumferential side surfaces of the battery cells can in better contact with the bottom surfaces of the recesses 38, providing a higher heat transfer efficiency, and improving the cooling efficiency of the battery cells 12.

Figure 3:
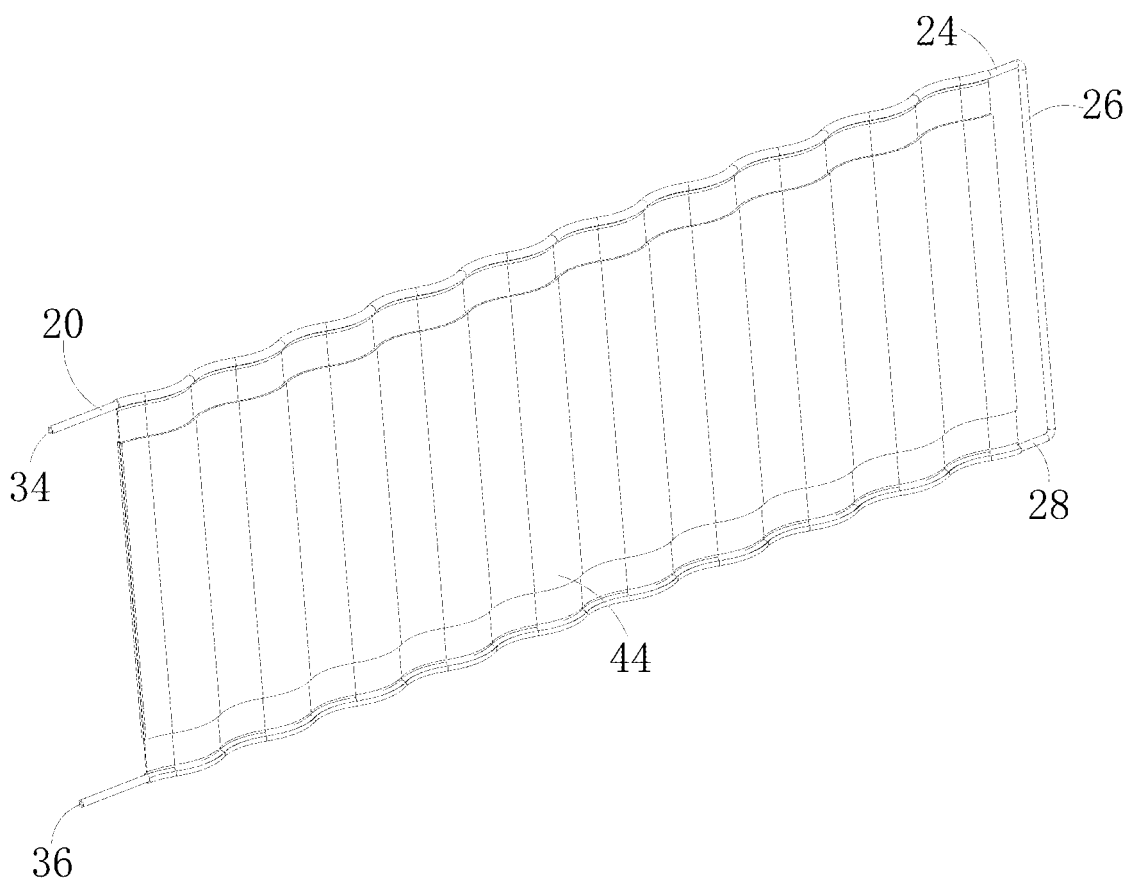
FIG. 3 is a three-dimensional schematic diagram of a liquid-cooled unit according to some embodiments of the present disclosure.
Figure 4:
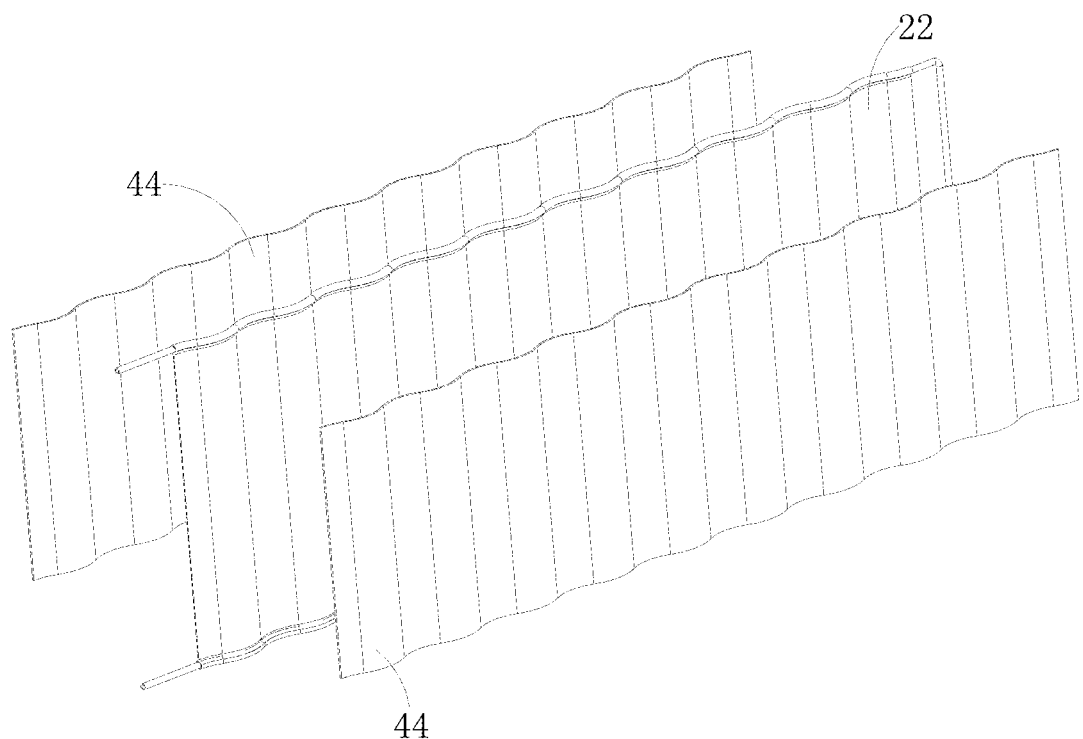
FIG. 4 is an exploded schematic diagram of a liquid-cooled unit according to some embodiments of the present disclosure.

In some embodiments, referring to FIG. 3, the first tube 24 is in a wavy shape matching a shape of the upper end 30 of the cooling fin 22, and the third tube 28 is in a wavy shape matching a shape of the lower end 32 of the cooling fin 22. Thus, the cooling efficiency of the battery cells 12 can be improved.

Specifically, the first tube 24 is in the wavy shape matching the shape of the upper end 30 of the cooling fin 22, and therefore, the contact area between the first tube 24 and the upper end 30 of the cooling fin 22 is relatively large, the heat transfer is fast, and the heat transfer efficiency of the upper end 30 of the cooling fin 22 and the first tube 24 is improved.

The third tube 28 is in the wavy shape matching the shape of the lower end 32 of the cooling fin 22, and therefore, the contact area between the third tube 28 and the lower end 32 of the cooling fin 22 is relatively large, the heat transfer is fast, and the heat transfer efficiency of the lower end 32 of the cooling fin 22 and the third tube 28 is improved. In conclusion, the cooling efficiency of the battery cells 12 can be improved.

It can be understood that in other embodiments, the first tube 24 is in a wavy shape matching a shape of the upper end 30 of the cooling fin 22, or the third tube 28 is in a wavy shape matching a shape of the lower end 32 of the cooling fin 22.

In some embodiments, the second tube 26 perpendicularly connects the first tube 24 with the third tube 28. Thus, the structure of the liquid-cooled unit 18 can be made more compact.

Specifically, the first tube 24 and the third tube 28 are arranged substantially in parallel, and the second tube 26 perpendicularly connects the first tube 24 with the third tube 28, so that the length of the second tube 26 can be reduced, the size of an outwardly convex part of the second tube 26 relative to the cell 12 module is reduced, thus, the structure of the liquid-cooled unit 18 is relatively compact, and thus the battery module 100 is miniaturized.

Figure 6:
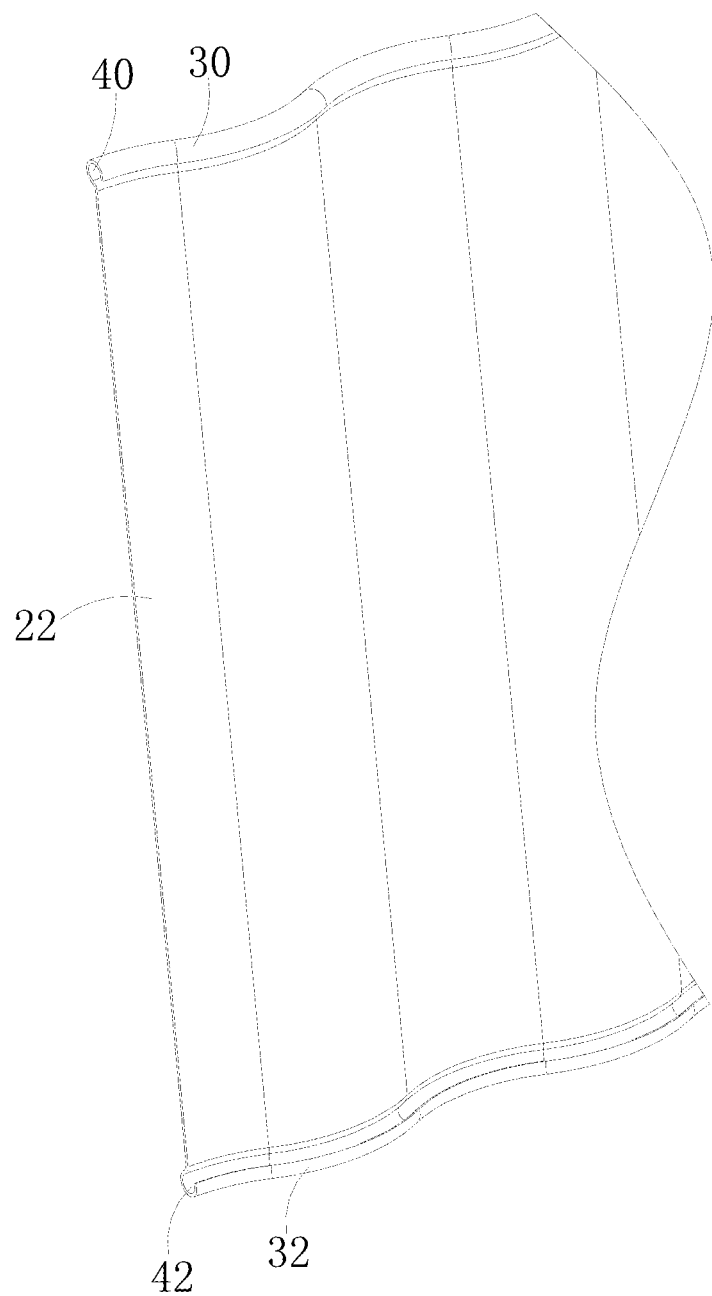
FIG. 6 is an enlarged view of a part of a cooling fin according to some embodiments of the present disclosure.

In some embodiments, referring to FIG. 6, the upper end 30 of the cooling fin 22 is bent to define a first accommodating groove 40, the lower end 32 of the cooling fin 22 is bent to define a second accommodating groove 42, the first tube 24 is accommodated in the first accommodating groove 40, and the third tube 28 is accommodated in the second accommodating groove 42. Thus, the contact area between the first tube 24 and the upper end 30 of the cooling fin 22 is increased, the contact area between the third tube 28 and the lower end 32 of the cooling fin 22 is increased, and thus the cooling efficiency of the battery cells 12 is improved.

Specifically, in the embodiment shown in the figure, each of the first tube 24 and the third tube 28 is cylindrical, and each of the first accommodating groove 40 and the second accommodating groove 42 is also cylindrical. When the first tube 24 is accommodated in the first accommodating groove 40, a circumferential side surface of the first tube 24 is basically in contact with an inner wall of the first accommodating groove 40; and when the third tube 28 is accommodated in the second accommodating groove 42, a circumferential side surface of the third tube 28 is in contact with an inner wall of the second accommodating groove 42.

Further, in the embodiment shown in the figure, when a terminal end of the upper end 30 of the cooling fin 22 is bent back towards the cooling fin 22, the terminal end is not connected to the cooling fin 22, so that the first accommodating groove 40 has an opening, and the first tube 24 can be squeezed into the first accommodating groove 40 from the opening. Similarly, when a terminal end of the lower end 32 of the cooling fin 22 is bent back towards the cooling fin 22, the terminal end is not connected to the cooling fin 22, so that the second accommodating groove 42 has an opening, and the third tube 28 can be squeezed into the second accommodating groove 42 from the opening. Thus, the installation of the liquid-cooled tube 20 and the cooling fin 22 can be facilitated.

When the first tube 24 is installed in the first accommodating groove 40, the first tube 24 can be clamped by an inner wall of the first accommodating groove 40. When the third tube 28 is installed in the second accommodating groove 42, the third tube 28 can be clamped by an inner wall of the second accommodating groove 42. Thus, the installation strength of the liquid-cooled tube 20 and the cooling fin 22 is improved.

Figure 5:
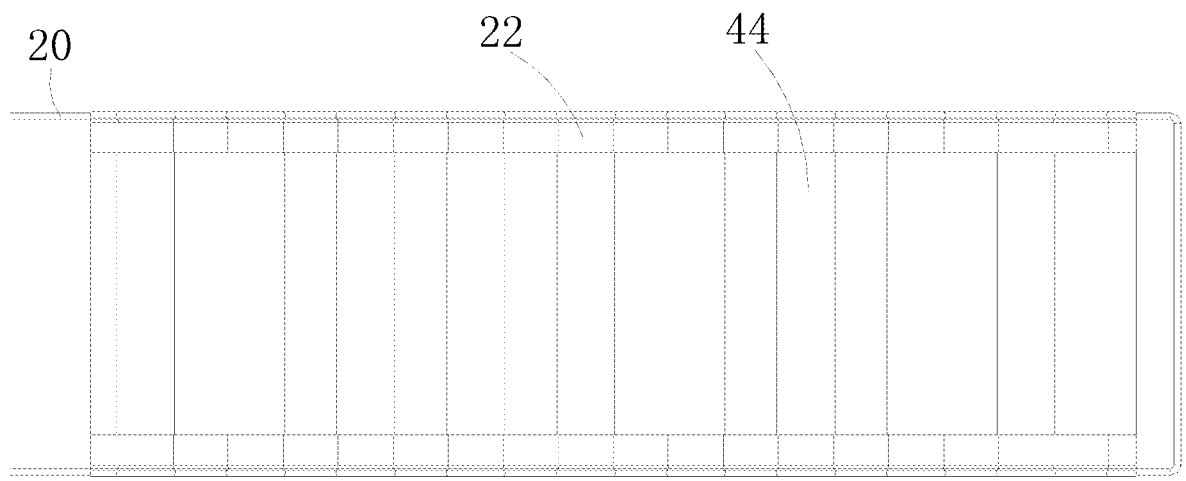
FIG. 5 is a plan schematic diagram of a liquid-cooled unit according to some embodiments of the present disclosure.
Figure 7:
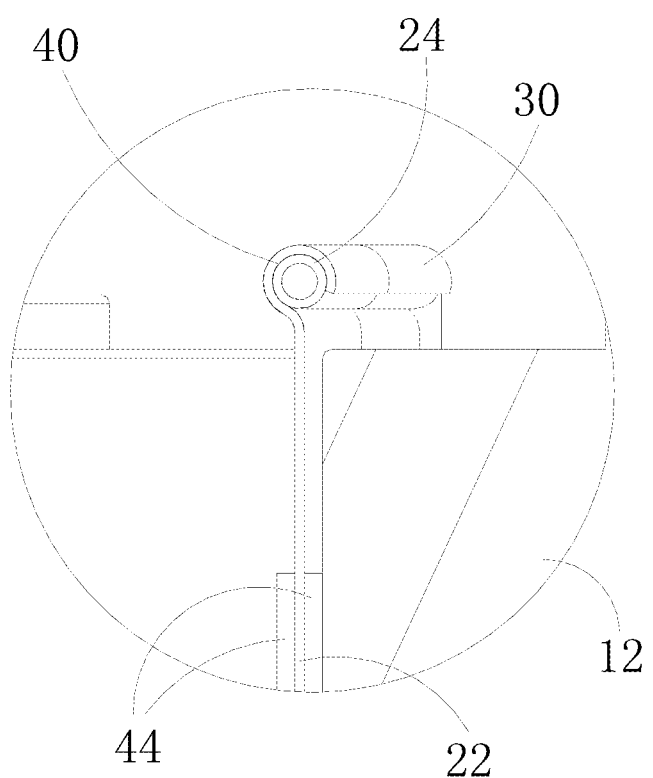
FIG. 7 is an enlarged view of a partial section of a battery module according to some embodiments of the present disclosure.

In some embodiments, referring to FIG. 3, FIG. 5, and FIG. 7, a thermal conductive pad 44 is arranged between the cooling fin 22 and the circumferential side surfaces of the battery cells, and the thermal conductive pad 44 connects the cooling fin 22 with the battery cells 12. Thus, the cooling efficiency of the battery cells 12 can be improved.

Specifically, the cooling fin 22 has a thermal conductive pad 44 provided on each of the two opposite sides thereof, and the thermal conductive pad 44 can cause the cooling fin 22 to be in better fit with the circumferential side surfaces of the battery cells 12, and improve the contact fitness between the cooling fin 22 and the circumferential side surfaces of the battery cells 12, thus increasing the cooling area, and improving the cooling efficiency of the battery cells 12. In one example, the thermal conductive pad 44 can be made of thermal conductive silica gel. It can be understood that the thermal conductive pad 44 of the present disclosure is not limited to the thermal conductive silica gel, and may be made of other materials, for example, the thermal conductive pad 44 can be made of carbon.

In the embodiment shown in the figure, a length of the thermal conductive pad 44 is substantially the same as a length of the cooling fin 22. A height of the thermal conductive pad 44 is smaller than a height of the cooling fin 22.

Embodiments of the present disclosure provide an energy storage device including the battery module 100 according to any one of the embodiments above.

According to the energy storage device, the liquid-cooled tube 20 is connected to the upper end 30 and lower end 32 of the cooling fin 22, one of the first opening 34 and the second opening 36 can serve as the liquid inlet, and the other one of the first opening 34 and the second opening 36 can serve as the liquid outlet. In the cooling process, the temperature of the liquid inlet is the lowest, the temperature gradually increases as the liquid flows in the liquid-cooled tube, and when the liquid reaches the liquid outlet, the temperature is the highest, that is, the temperature of the upper part of the liquid-cooled tube 20 and the temperature of the lower part of the liquid-cooled tube 20 increase in opposite directions relative to each other, so that the temperature at each position of the cooling fin 22 can be kept consistent, the temperatures of the battery cells 12 can be kept consistent, thus, the consistency of the cooling effects of the battery cells 12 is improved, and the performance consistency of the battery cells 12 is improved.

Specially, the energy storage device can include one battery module 100 or a plurality of battery modules 100, and can further include a cluster frame on which the plurality of battery modules 100 can be mounted. For example, the plurality of battery modules 100 can be mounted in the form of a matrix on the cluster frame. The plurality of battery modules 100 is electrically connected in series, parallel or series-parallel.

The energy storage device can be made in the form of a household energy storage cabinet or a small container. The energy storage device can be placed in a designated position indoors or outdoors. The energy storage device can be used to store electrical energy converted from solar energy.

In the description of this specification, the description with reference to the terms "one embodiment", "some embodiments", "exemplary embodiments", "examples", "specific examples", or "some examples", etc. means that the specific features, structures, materials, or characteristics described with reference to the embodiments or examples are involved in at least one embodiment or example of this disclosure. In this specification, schematic representations of the above terms do not necessarily refer to the same embodiment or example. Furthermore, the particular features, structures, materials, or characteristics described may be combined in any suitable manner in any one or more embodiments or examples.

While embodiments of the present disclosure have been described above, it is understood that the embodiments are exemplary and should not be understood as limitations to the present disclosure, and changes, modifications, substitutions, and variations can be made by those skilled in the art within the scope of the present disclosure.

What is claimed is:

1. A battery module, comprising:
   a plurality of battery cells each in a cylindrical shape, the plurality of battery cells being arranged in at least two rows; and
   a liquid-cooled assembly comprising at least one liquid-cooled unit, wherein each of the at least one liquid-cooled unit comprises a liquid-cooled tube and a cooling fin, the liquid-cooled tube comprising a first tube arranged at an upper end of the cooling fin, a second tube, and a third tube arranged at a lower end of the cooling fin, wherein the second tube connects one end of the first tube with one end of the third tube, wherein the cooling fin is arranged between two adjacent rows and is connected to circumferential side surfaces of battery cells in the two adjacent rows, wherein the first tube has a first opening defined in another end thereof facing away from the second tube, and the third tube has a second opening defined in another end thereof facing away from the second tube, the first opening and the second opening being located on a same side of the at least two rows,
   wherein the upper end of the cooling fin is bent to define a first accommodating groove, and the lower end of the cooling fin is bent to define a second accommodating groove, the first tube being accommodated in the first accommodating groove, the third tube being accommodated in the second accommodating groove.

2. The battery module according to claim 1, wherein the cooling fin is of a wavy structure, the wavy structure having a plurality of recesses defined on two opposite surfaces thereof, wherein the circumferential side surfaces of the battery cells are partially accommodated in the plurality of recesses, respectively.

3. The battery module according to claim 2, wherein a radian of a bottom surface of each of the plurality of recesses is substantially same as a radian of a circumferential side surface of each of the battery cells.

4. The battery module according to claim 2, wherein the first tube is in a wavy shape matching a shape of the upper end of the cooling fin, and/or the third tube is in a wavy shape matching a shape of the lower end of the cooling fin.

5. The battery module according to claim 1, wherein the second tube perpendicularly connects the first tube with the third tube.

6. The battery module according to claim 1, wherein a thermal conductive pad is arranged between the cooling fin and the circumferential side surfaces of the battery cells, the thermal conductive pad connecting the cooling fin with the battery cells.

7. An energy storage device, comprising a battery module comprising:
   a plurality of battery cells each in a cylindrical shape, the plurality of battery cells being arranged in at least two rows; and
   a liquid-cooled assembly comprising at least one liquid-cooled unit, wherein each of the at least one liquid-cooled unit comprises a liquid-cooled tube and a cooling fin, the liquid-cooled tube comprising a first tube arranged at an upper end of the cooling fin, a second tube, and a third tube arranged at a lower end of the cooling fin, wherein the second tube connects one end of the first tube with one end of the third tube, wherein the cooling fin is arranged between two adjacent rows and is connected to circumferential side surfaces of battery cells in the two adjacent rows, wherein the first tube has a first opening defined in another end thereof facing away from the second tube, and the third tube has a second opening defined in another end thereof facing away from the second tube, the first opening and the second opening being located on a same side of the at least two rows,
   wherein the upper end of the cooling fin is bent to define a first accommodating groove, and the lower end of the cooling fin is bent to define a second accommodating groove, the first tube being accommodated in the first accommodating groove, the third tube being accommodated in the second accommodating groove.

8. The energy storage device according to claim 7, wherein the cooling fin is of a wavy structure, the wavy structure having a plurality of recesses defined on two opposite surfaces thereof, and wherein the circumferential side surfaces of the battery cells are partially accommodated in the plurality of recesses, respectively.

9. The energy storage device module according to claim 8, wherein a radian of a bottom surface of each of the plurality of recesses is substantially same as a radian of a circumferential side surface of each of the battery cells.

10. The energy storage device module according to claim 8, wherein the first tube is in a wavy shape matching a shape of the upper end of the cooling fin, and/or the third tube is in a wavy shape matching a shape of the lower end of the cooling fin.

11. The energy storage device according to claim 7, wherein the second tube perpendicularly connects the first tube with the third tube.

12. The energy storage device according to claim 7, wherein a thermal conductive pad is arranged between the cooling fin and the circumferential side surfaces of the battery cells, the thermal conductive pad connecting the cooling fin with the battery cells.

* * * * *